Oct. 28, 1958   J. H. McCULLOCH   2,858,357
MOUNTING FOR INDUCTIVE DEVICE
Filed Oct. 15, 1953
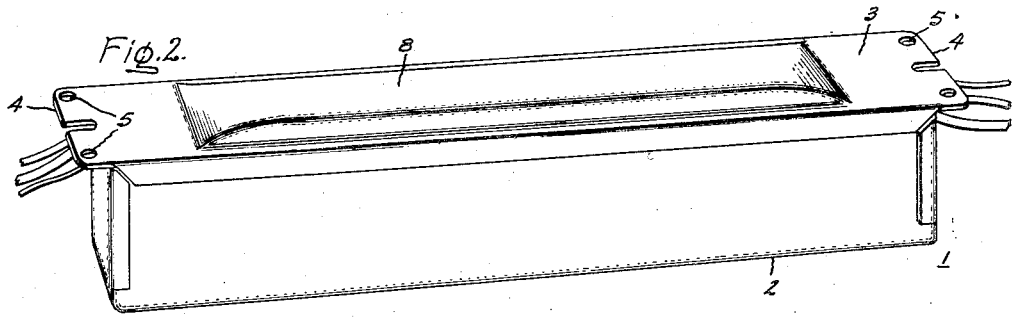
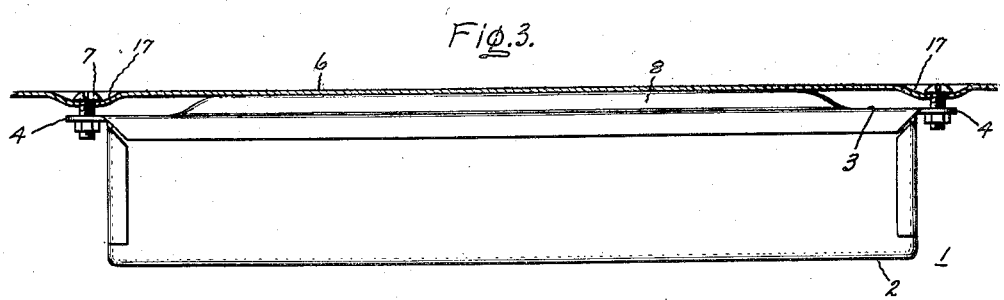
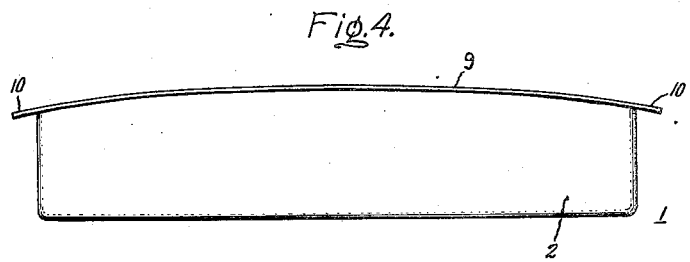
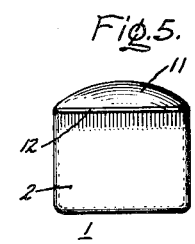
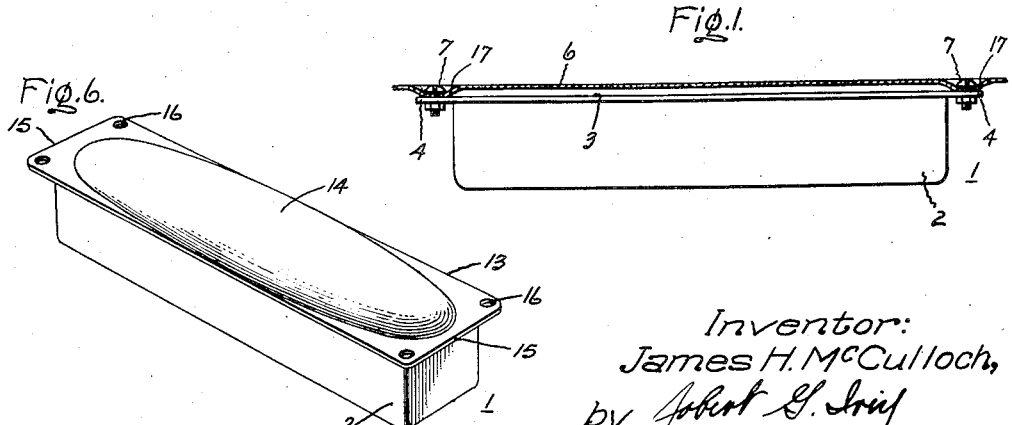
Inventor:
James H. McCulloch,
by Robert G. Irish
His Attorney

United States Patent Office 2,858,357
Patented Oct. 28, 1958

2,858,357

MOUNTING FOR INDUCTIVE DEVICE

James H. McCulloch, Fort Wayne, Ind., assignor to General Electric Company, a corporation of New York Application October 15, 1953, Serial No. 386,345

3 Claims. (Cl. 174—52)

This invention relates to inductive devices such as small transformers and more particularly to the mounting of such devices.

Small transformers, such as ballasting transformers used in connection with fluorescent lighting installations are frequently mounted on a thin sheet metal supporting member, for example a fixture for a fluorescent lamp, and are usually hanging or suspended therefrom. All inductive devices convert some energy into noise, this noise being typically caused by magnetically produced vibration of the core laminations and coils. In addition, all inductive devices convert some energy into leakage flux which may cause vibration of the transformer case or an external member to which the device is secured. The air borne noise produced by magnetically induced vibration or by the leakage flux may not in itself be objectionable; the unmounted device may be satisfactory from a noise standpoint. However, when the device is mounted against a member which can act as a sounding board, the airborne noise may be amplified and the leakage flux may cause vibration of the member so that the resultant noise level may be highly objectionable.

It is well-known that vibration of a member can be dampened by attaching a mass thereto and it would seem that the mere attachment of the relatively heavy ballast transformer to the fixture would provide sufficient mass to prevent this undesirable vibration. However, it has been found that by virtue of the relatively thin sheet metal from which fluorescent fixtures are fabricated, and to which the ballast is attached by bolts or screws, the weight of the ballast may deform the metal of the fixture so that the ballast is not in close contact therewith thus resulting in a space between the base of the ballast and the fixture. In addition, there may be warpage in the fixture which results in the ballast being separated therefrom. When the ballast is separated from the portion of the fixture on which it is mounted, it has been found that the airborne noise and leakage flux from the ballast causes the fixture to vibrate causing objectionable noise. This may be mere amplification; however, if the gap is relatively close, the vibrating fixture may hit the ballast producing a very objectionable buzzing noise. The lack of contact between the ballast and the fixture also prevents heat dissipation by conduction from the ballast into the fixture.

Therefore it is seen that it is very desirable that an inductive device be mounted in intimate and continuous contact with the member to which it is secured so that the mass of the inductive device will dampen the inherent vibration caused by airborne noise and leakage flux. In addition, it is desirable that the device be in close contact with the member to which it is secured in order to provide for maximum conductive heat transfer. However, it is not possible for economic reasons to fabricate fluorescent fixtures from sufficiently heavy sheet metal to prevent deformation and warping and it is therefore desirable to provide a ballast design which will insure as much continuous and intimate contact with the fixture as possible.

It is therefore an object of this invention to provide an improved inductive device incorporating the desirable features set forth above.

Further objects and advantages of this invention will become apparent and the invention will be better understood by reference to the following description and to the accompanying drawing, and the features of novelty which characterize this invention will be pointed out with particularity in the claims annexed to and forming a part of this specification.

This invention in its broadest aspects utilizes the tendency of thin sheet metal to deform and warp and accordingly, the inductive device is provided with a portion projecting beyond the mounting means so that when the device is secured to a sheet metal mounting member, the sheet metal is deformed into intimate and continuous contact with the projecting portion.

In the drawing,

Fig. 1 is a side elevational view illustrating the condition which exists when ballasts which do not incorporate the improved construction of this invention are secured to fixtures formed of relatively thin metal;

Fig. 2 is a side elevational view showing a fluorescent ballast transformer incorporating the improved construction of this invention;

Fig. 3 is a side elevational view of the ballast of Fig. 2 showing it attached to a supporting member;

Fig. 4 is a side elevational view of a modified form of this invention;

Fig. 5 is an end view of another modified form of this invention; and

Fig. 6 is a view in perspective showing yet another modified form of this invention.

Referring now to Fig. 1, there is shown a ballast transformer 1 having an enclosing case 2 in which the core and coils (not shown) are arranged. The case 2 is closed by a base member or wall 3 which has extensions 4 formed at either end thereof. Extensions 4 are provided with suitable holes to accommodate bolts 7 for securing the ballast 1 to fluorescent fixture 6. It is seen from Fig. 1 that the weight of the ballast 1 tends to deform the relatively thin sheet metal of fixture 6 as at 17. This deformation causes the base 3 of ballast 1 to be separated from sheet metal 6 thereby permitting vibration due to airborne noise and leakage flux.

In order to provide intimate contact between the ballast 1 and the relatively thin sheet metal formed in fixture 6 thereby reducing vibration and improving heat transfer, the arrangement of Figs. 2 and 3 is provided in which an elongated outwardly projecting, longitudinally extending projection or boss 8 is formed on the outer surface of base 3 intermediate extensions 4. It is thus seen that tightening of bolts 7, which extend through holes 5 in extension 4, will tend to deform sheet metal 6 into intimate and continuous contact with the boss 8 thereby dampening the vibration which otherwise would be produced.

Referring now to Fig. 4, the base 9 of the ballast 1 may be continuously outwardly bowed between its extensions 10 thus providing the deformation of the mounting member to which the ballast 1 is secured to assure intimate and continuous contact.

Referring to Fig. 5, the base 11 may be transversely curved outwardly from side to side intermediate the extensions 12 thus again providing a projection portion to insure continuous and intimate contact of the ballast base with the mounting member when the ballast is secured thereto.

While Figs. 1 and 2 show the preferred form of this improved ballast construction, Fig. 6 shows the form which is best from a noise elimination standpoint. Here, the base 13 has an elongated elliptical shaped boss 14 formed thereon which has a generally curved cross-section. Outwardly projecting boss 14 is formed intermediate extensions 15 in which mounting holes 16 are formed. In this embodiment, the sheet metal of the supporting member is not only deformed longitudinally but also and at the same time deformed transversely thereby providing the greatest area of intimate contact with the boss 14.

It will now be seen that this invention provides an improved ballast construction which assures continuous and intimate contact with the supporting member to which it is secured thereby dampening airborne noise and leakage flux which tend to produce vibration of the supporting member and improving heat transfer by increased conduction.

While I have shown and described particular embodiments of this invention, further modifications and improvements will occur to those skilled in the art.

I desire that it be understood therefore that this invention is not limited to the forms shown and I intend in the appended claims to cover all modifications which do not depart from the spirit and scope of this invention.

What I claim as new and desired to secure by Letters Patent of the United States is:

1. An inductive device having an elongated base member with mounting means formed at the ends thereof adapted to secure said device to a mounting member, said base member having the greater portion thereof intermediate said mounting means projecting outwardly therefrom and resiliently deformable inwardly when said device is secured to said mounting member for assuring continuous and intimate contact with said mounting member thereby providing means for dampening the vibration thereof and improving heat transfer thereto.

2. An inductive device having an elongated, generally rectangular enclosing case including a base wall, said base wall having extensions respectively formed on either end of said case adapted to secure said device to a supporting member, said base wall having the major portion thereof intermediate said extensions deformed outwardly to provide an elongated rounded surface adapted to be resiliently deformed inwardly when said device is secured to said supporting member whereby to assure continuous and intimate contact with said supporting member thereby dampening vibration thereof and improving heat transfer thereto.

3. An inductive device as set forth in claim 2 wherein the base wall has an elliptical shaped outwardly extending boss formed integrally therewith intermediate said extensions with a generally curved cross-section for assuring continuous and intimate contact with said supporting member thereby dampening vibration thereof and improving heat transfer.

References Cited in the file of this patent

UNITED STATES PATENTS

| | | |
|---|---|---|
| 974,681 | Le Manquais | Nov. 1, 1910 |
| 2,151,084 | Deremer | Mar. 21, 1939 |
| 2,413,953 | Comstock | Jan. 7, 1947 |
| 2,433,511 | Goddard | Dec. 30, 1947 |
| 2,748,185 | Brunke | May 29, 1956 |